(12) United States Patent
Liao

(10) Patent No.: US 8,292,321 B2
(45) Date of Patent: Oct. 23, 2012

(54) GOLF BAG CART FOLDABLE DEVICE

(75) Inventor: Gordon Liao, Yung Kang (TW)

(73) Assignee: Unique Product & Design Co., Ltd., Yung Kang, Tainan Hsien (TW)

( * ) Notice: Subject to any disclaimer, the term of this patent is extended or adjusted under 35 U.S.C. 154(b) by 264 days.

(21) Appl. No.: 12/784,605

(22) Filed: May 21, 2010

(65) Prior Publication Data

US 2011/0285111 A1    Nov. 24, 2011

(51) Int. Cl.
*B62B 3/02* (2006.01)
(52) U.S. Cl. ............... 280/652; 280/651; 280/47.26
(58) Field of Classification Search .......... 280/654–655, 280/645, 646–647, 642, 639, 47.17, 47.26, 280/47.315, DIG. 5; 248/96, 95, 98, 97
See application file for complete search history.

(56) References Cited

U.S. PATENT DOCUMENTS

| | | | | |
|---|---|---|---|---|
| 3,058,706 A * | 10/1962 | Snell | | 248/27.8 |
| 4,784,401 A * | 11/1988 | Raguet | | 280/40 |
| 5,180,184 A * | 1/1993 | Chiu | | 280/646 |
| 6,199,885 B1 * | 3/2001 | Seidl | | 280/276 |
| 6,719,319 B2 * | 4/2004 | Liao | | 280/654 |
| 6,811,178 B2 * | 11/2004 | Tomasi et al. | | 280/650 |
| 7,000,983 B1 * | 2/2006 | Tsai | | 297/56 |
| 7,128,333 B2 * | 10/2006 | Reimers et al. | | 280/651 |
| 7,726,683 B2 * | 6/2010 | Moriguchi et al. | | 280/642 |
| 7,866,685 B2 * | 1/2011 | Liao | | 280/651 |
| 8,128,104 B2 * | 3/2012 | Liao | | 280/38 |
| 2005/0046130 A1 * | 3/2005 | Cheng et al. | | 280/47.26 |
| 2008/0067786 A1 * | 3/2008 | Liu et al. | | 280/639 |
| 2008/0251653 A1 * | 10/2008 | Manus | | 248/96 |
| 2010/0176577 A1 * | 7/2010 | Liao | | 280/651 |

* cited by examiner

*Primary Examiner* — John Walters
*Assistant Examiner* — James Triggs
(74) *Attorney, Agent, or Firm* — Alan Kamrath; Kamrath IP Lawfirm, PA

(57) ABSTRACT

A golf bag cart foldable device includes a bottom cart stand having a plate joint in pinned connection with a rear wheel frame to connect to rear wheels and is connected to a bag base. The bottom of the bag base is further joined to a front wheel frame, to connect to the front wheel. An upper cart stand is pivotally connected to the plate joint. A sliding chunk set, slideable along the bottom cart stand, includes an active sliding chunk and a passive sliding chunk. A link set is connected to the upper cart stand, the bottom cart stand, the front wheel frame, the rear wheel frames and the sliding chunk set respectively. A folding joint has a buckle for release of the folding joint. Simultaneous unfolding or folding can be accomplished, followed by locking for the folding joint, to facilitate handiness in use.

4 Claims, 11 Drawing Sheets

GOLF BAG CART FOLDABLE DEVICE

BACKGROUND OF THE INVENTION

1. Field of the Invention

This invention relates to a golf bag cart foldable device and more particularly, to one that features simultaneous unfolding or folding for an upper cart stand, a bottom cart stand, a front wheel and rear wheels, to facilitate handiness in use.

2. Description of the Prior Art

The foldable devices of prior golf bag carts are in a general shape as in FIG. 11, where an upper cart stand 7 (that is, the handle bar) and a rear wheel frame 71 are joined together by a strut bar 72. Once the upper cart stand 7 is pulled, two rear wheels 73 are linked to shift inward. However, the folding of the front wheel 74 and of the rear wheels 73 are independent of each other, which are unable to be folded simultaneously. Thus, a user has to squat down to operate a front wheel folding joint 75 and pull front wheel 74 for a frontward (or backward) folding, for the completion of the folding of the bag cart. On the contrary, the unfolding of the cart for use still demands a user to squat down to operate the front wheel 74 too, which is substantially inconvenient, especially for the situations that the front wheel 74 and the rear wheels 73 are stuck with dirt, weeds or/and mud as the cart has already moved in the golf course. Also the folding of the front wheel 74 at this moment would no doubt smudge the hands and the dress, which is awful and awkward to operate.

SUMMARY OF THE INVENTION

The objective of this invention is to provide a golf bag cart foldable device, which features simultaneous unfolding or folding for a upper cart stand, a bottom cart stand, a front wheel and rear wheels, to achieve particular handiness in use.

To achieve the aforementioned objective, this invention comprises: a bottom cart stand having a plate joint at its top. The plate joint is in pinned connection with a rear wheel frame at each of its two laterals, to connect to the rear wheels respectively, and is connected to a bag base at its bottom. The bottom of the bag base is further joined to a front wheel frame, to connect to the front wheel. An upper cart stand, having a winding member at its bottom, is pivotally connected to the plate joint. A sliding chunk set, set up on the bottom cart stand and available to slide along the bottom cart stand, is made up of an active sliding chunk and a passive sliding chunk. A link set, made up of a plurality of links, is connected to the upper cart stand, the bottom cart stand, the front wheel frame, the rear wheel frames and the sliding chunk set respectively, to form links between the upper cart stand and the bottom cart stand and between the front wheel frame and the rear wheel frame. A folding joint, set up on the winding member of the upper cart stand, has a buckle for the release of the folding joint first, and the upper cart stand is pulled, by the links between the link set with the sliding chunk set and the front wheel frame with the rear wheel frame. The simultaneous unfolding or folding of the upper cart stand, the bottom cart stand, the front wheel and the rear wheels can thus be accomplished, followed by a locking for the folding joint, to enable a mutual locking between the upper cart stand and the bottom cart stand, to facilitate handiness in use.

DETAILED DESCRIPTION OF THE INVENTION

Figure 1:
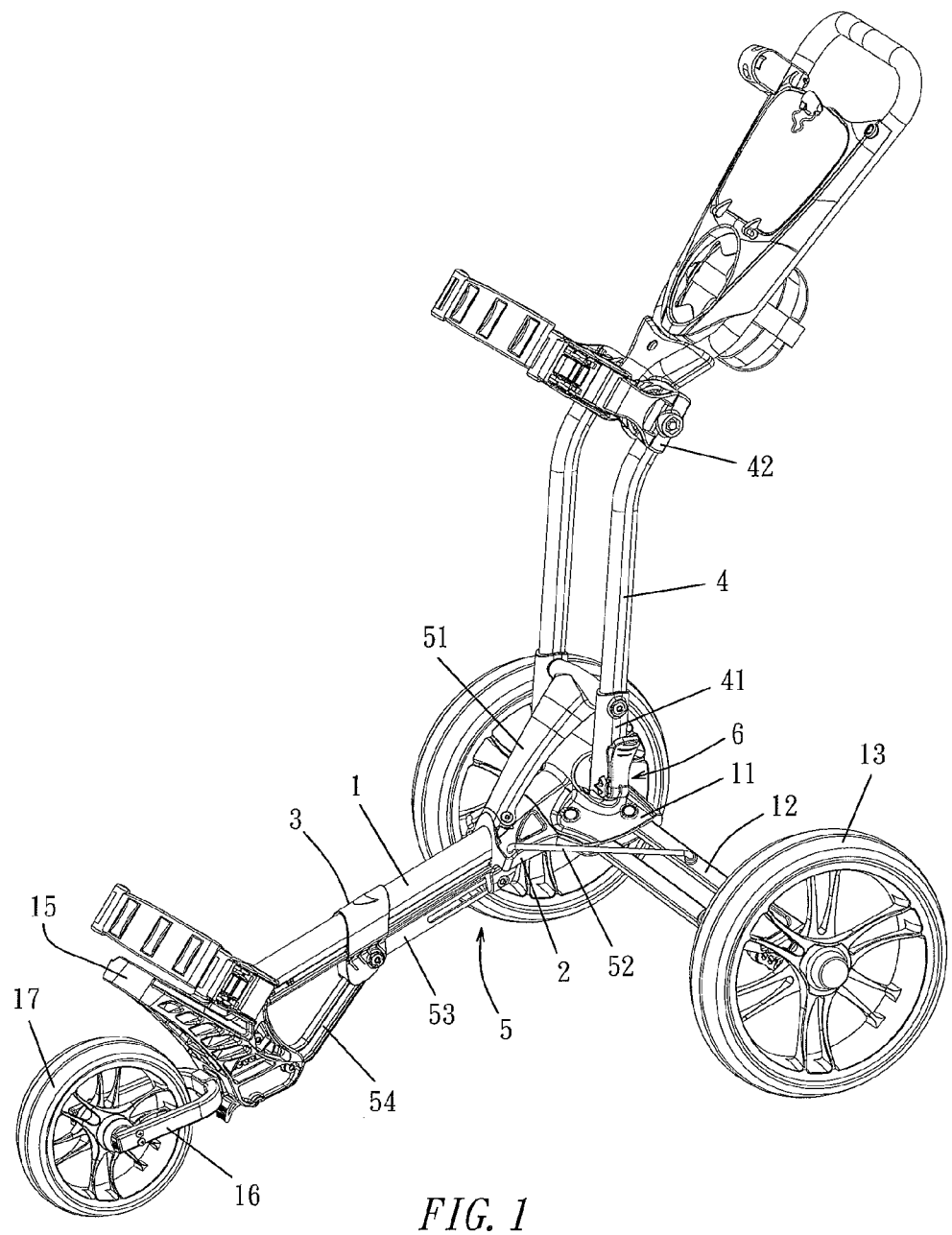
FIG. 1 is a three-dimensional diagram of unfolding of a golf bag cart according to the present invention.

The structural traits and the functions of this invention are described in detail with reference to the following preferred embodiments and the accompanying drawings, which would help to comprehend thoroughly the present invention.

Referring to FIGS. 1-7, this invention includes a bottom cart stand 1 having a plate joint 11 at its top. The plate joint 11 is in pinned connection with a rear wheel frame 12 at each of its two laterals. The distal end of each rear wheel frame 12 is connected to a rear wheel 13. The rear wheel frame has a fixing chunk 14 at its bottom that is pivotally connected to a bag base 15. The bag base 15 is further joined fixedly to a front wheel frame 16. The distal end of the front wheel frame 16 is connected to a front wheel 17, and the bottom cart stand 1 is provided with a track groove 18 indented at each of its two laterals. The fixing chunk 14 and the bag base 15 each has a positioning face 141, 151 and the positioning faces 141, 151 are fit to each other.

A sliding chunk set, set up on the bottom cart stand 1 and available to slide along the bottom cart stand 1, is made up of an active sliding chunk 2 and a passive sliding chunk 3. The active sliding chunk 2, at the top of the bottom cart stand 1 and close to the plate joint 11, has a protruded track 21 at each of its two inner sides, which correspond to the track grooves 18 of the bottom cart stand 1 respectively. The active sliding chunk 2 is connected to a third link 53 at its bottom by a fixing element 22 (for instance: a bolt). The passive sliding chunk 3, at the bottom of the bottom cart stand 1, has a protruded track 31 at each of its two inner sides which correspond to the track grooves 18 respectively. The passive sliding chunk 3 is connected to the third link 53 and a fourth link 54 at its bottom by a fixing element 32.

An upper cart stand 4, having a winding member 41 at its bottom which is pivotally connected to the plate joint 11 of bottom cart stand 1, is pivotally connected to an upper mount 42 at its top.

A link set 5, made up of a plurality of links, is connected to the upper cart stand 4, the bottom cart stand 1, the front wheel frame 16, the rear wheel frames 12 and the sliding chunk set respectively, to form links between the upper cart stand 4 and the bottom cart stand 1 and between the front wheel frame 16 and the rear wheel frames 12. The link set 5 comprises at least a first link 51, a second link 52, a third link 53 and a fourth link 54. The first link 51 is coupled to the winding member 41 at its top and to the active sliding chunk 2 at its bottom, to form a link between the upper cart stand 4 and the bottom cart stand 1. The second link 52 is coupled to the active sliding chunk 2 at its one end and to the rear wheel frames 12 at the other end, to form links between the upper cart stand 4 and the rear wheel frames 12. The third link 53 is set up at the bottom of the bottom cart stand 1 and is coupled to somewhere between the active sliding chunk 2 and the passive sliding chunk 3. A front part of the third link 53 (located at the active sliding chunk 2) is set up with an elongated indent 531 that is connected to the fixing element 22, to form an indent passive mechanism, which enables the active sliding chunk 2 not only to have a path constraint during its sliding but to drive the passive sliding chunk 3 to move, relative to the third link 53. The fourth link 54 is coupled to the passive sliding chunk 3 at its one end and to the bag base 15 (that is, the front wheel frame 16) at the other end, to form a link between the upper cart stand 4 and the front wheel 17 (the front wheel frame 16) through the links between the first link 51, the active sliding chunk 2, the third link 53 and the passive sliding chunk 3 and the fourth link 54.

A folding joint 6, set up on the winding member 41 of the upper cart stand 4, includes a buckle 61 in pinned connection with one lateral of the winding member 41; two movable chain wheels 62 in the inner side of the winding member 41; two fixed chain wheels 63 on the top outer side of the plate joint 11, to correspond to the movable chain wheels 62 respectively; and two springs 64. Each spring 64 is in between a fixed chain wheel 63 and the corresponding movable chain wheel 62, which generates a force to press the movable chain wheel 62 outward. Once the buckle 61 is pressed upward for tightening, the inward moving of the movable chain wheel 62 is used to clench the corresponding fixed chain wheel 63. By fixing the winding member 41, the angle formed by the upper cart stand 4 and the bottom cart stand 1 can be locked. On the contrary, once the buckle 61 is pressed downward for releasing, the movable chain wheel 62 is pushed outward to escape from the corresponding fixed chain wheel 63, subject to the resilient force of the spring 64, which enables the winding member 41 to move and spin.

Figure 2:
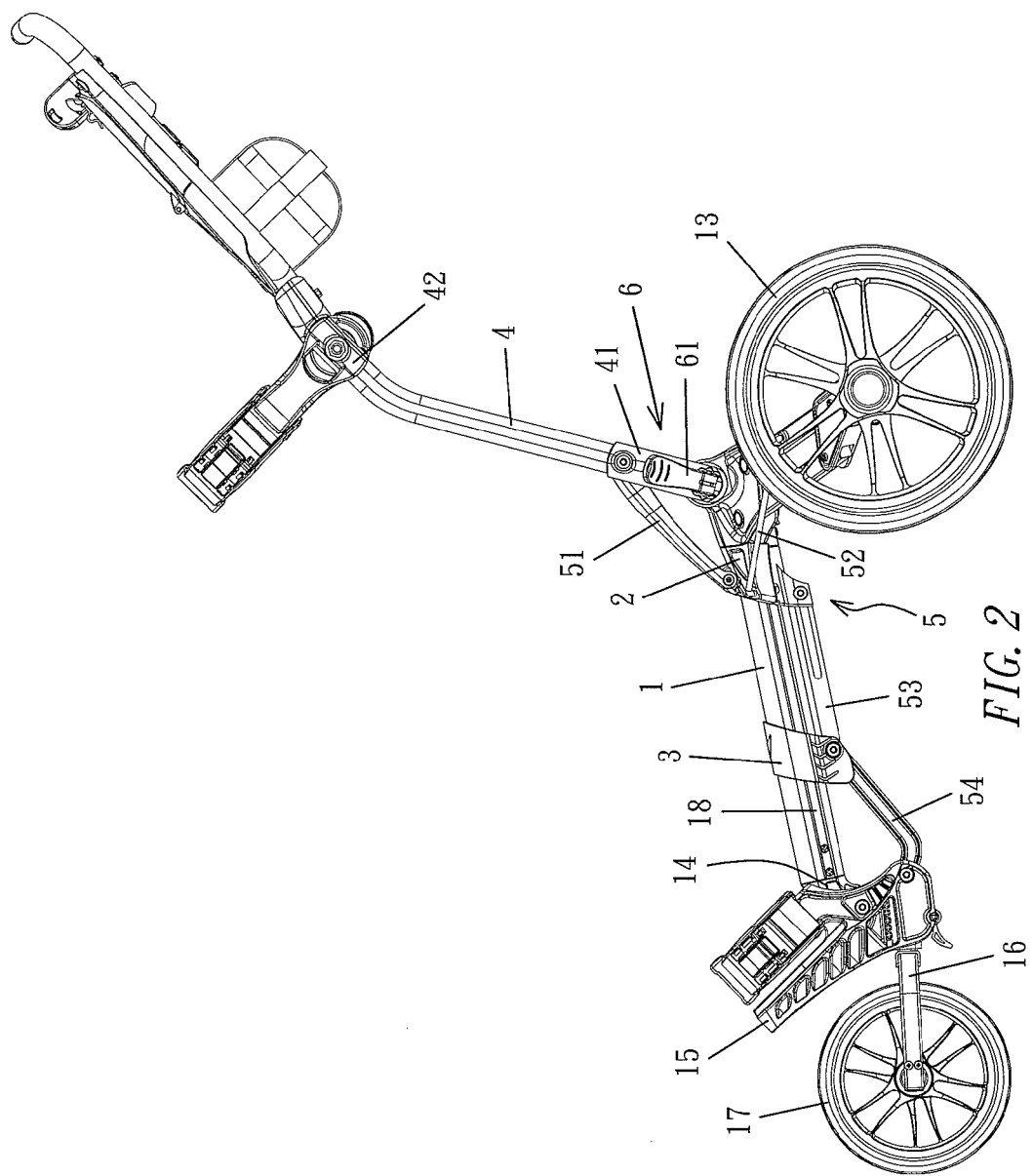
FIG. 2 is a side view of the unfolding of a golf bag cart according to the present invention.
Figure 3:
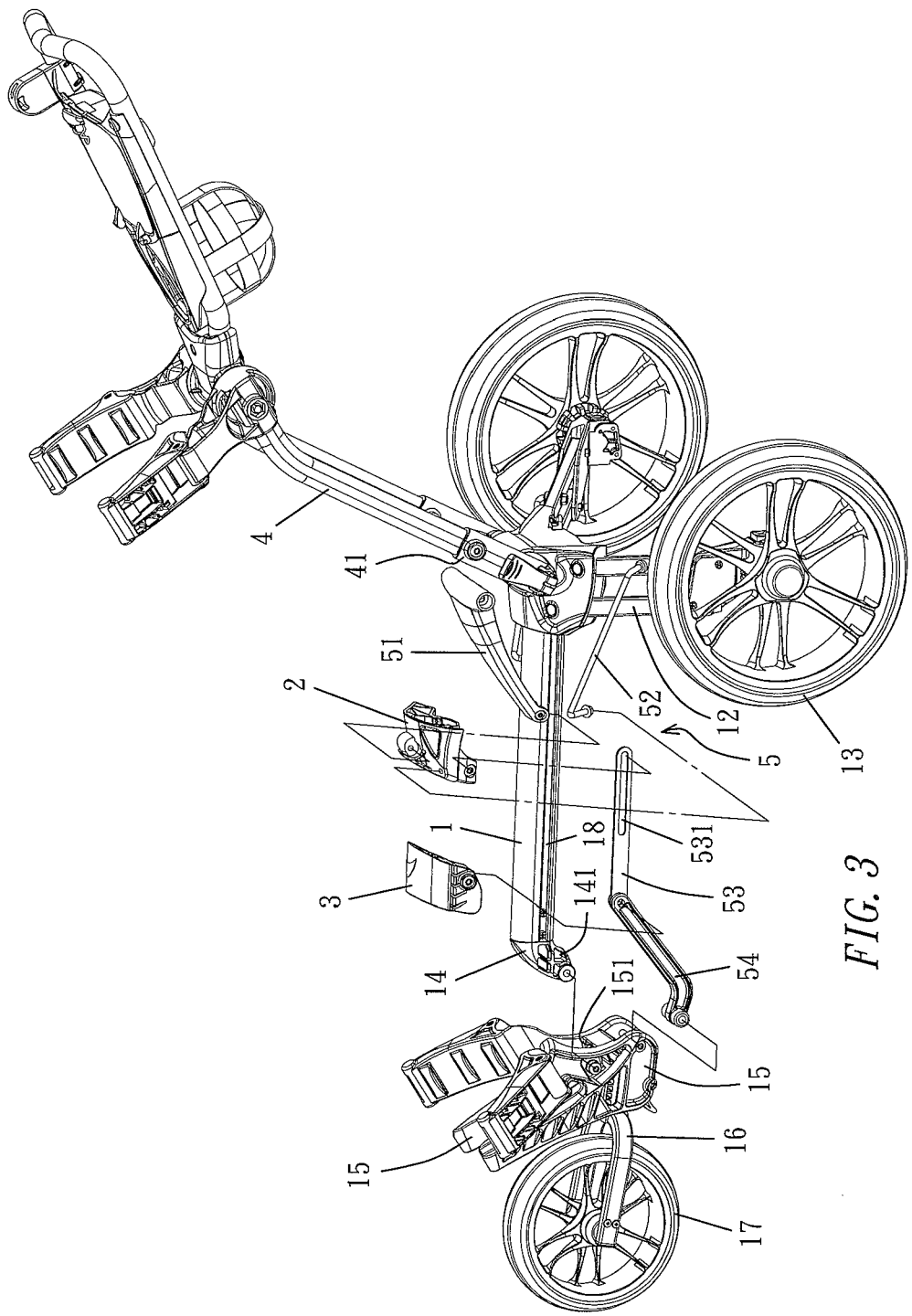
FIG. 3 is an exploded view of the bottom cart stand together with the sliding chunk set and the link set according to the present invention.
Figure 4:
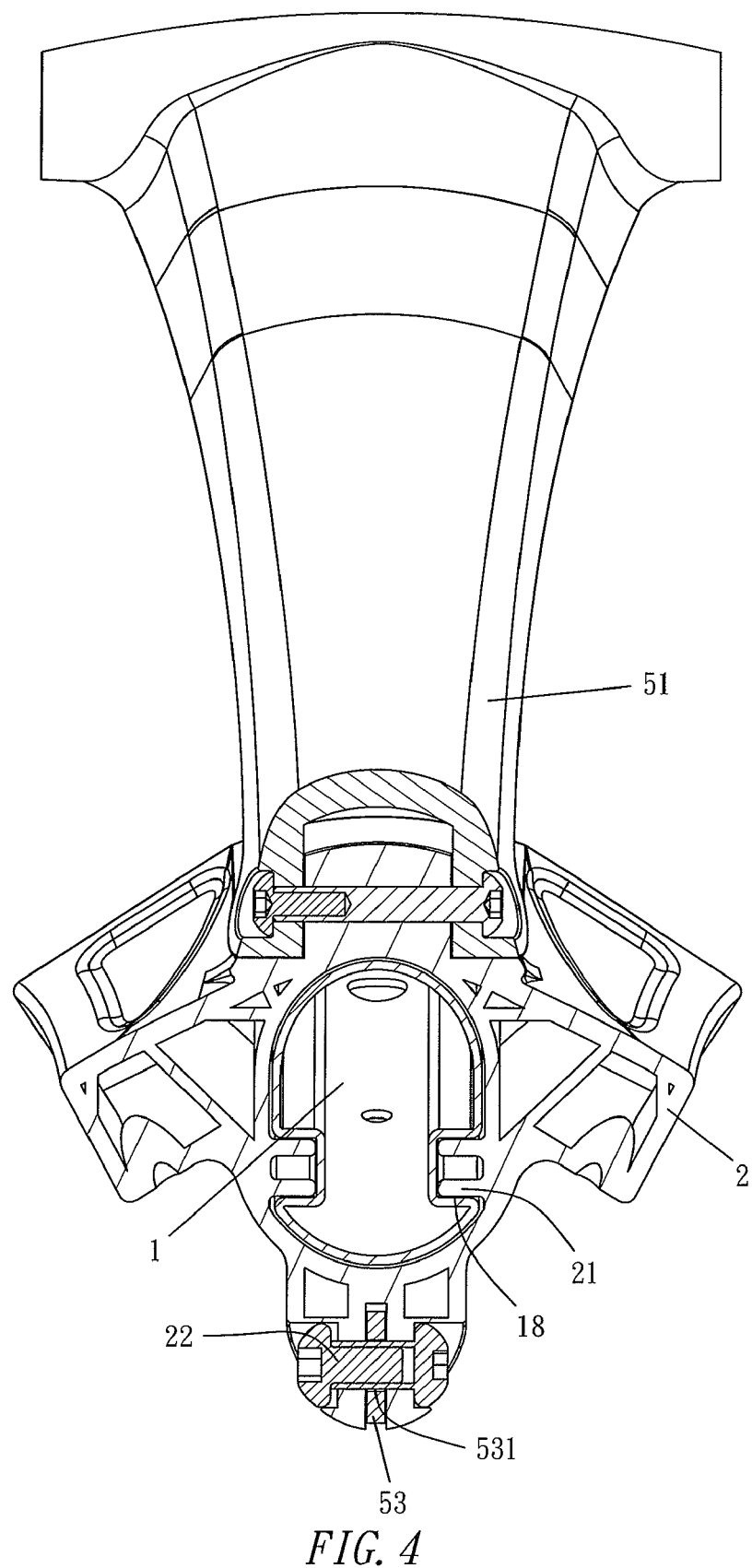
FIG. 4 is a sectional view of the bottom cart stand and the active sliding chunk according to the present invention.
Figure 5:
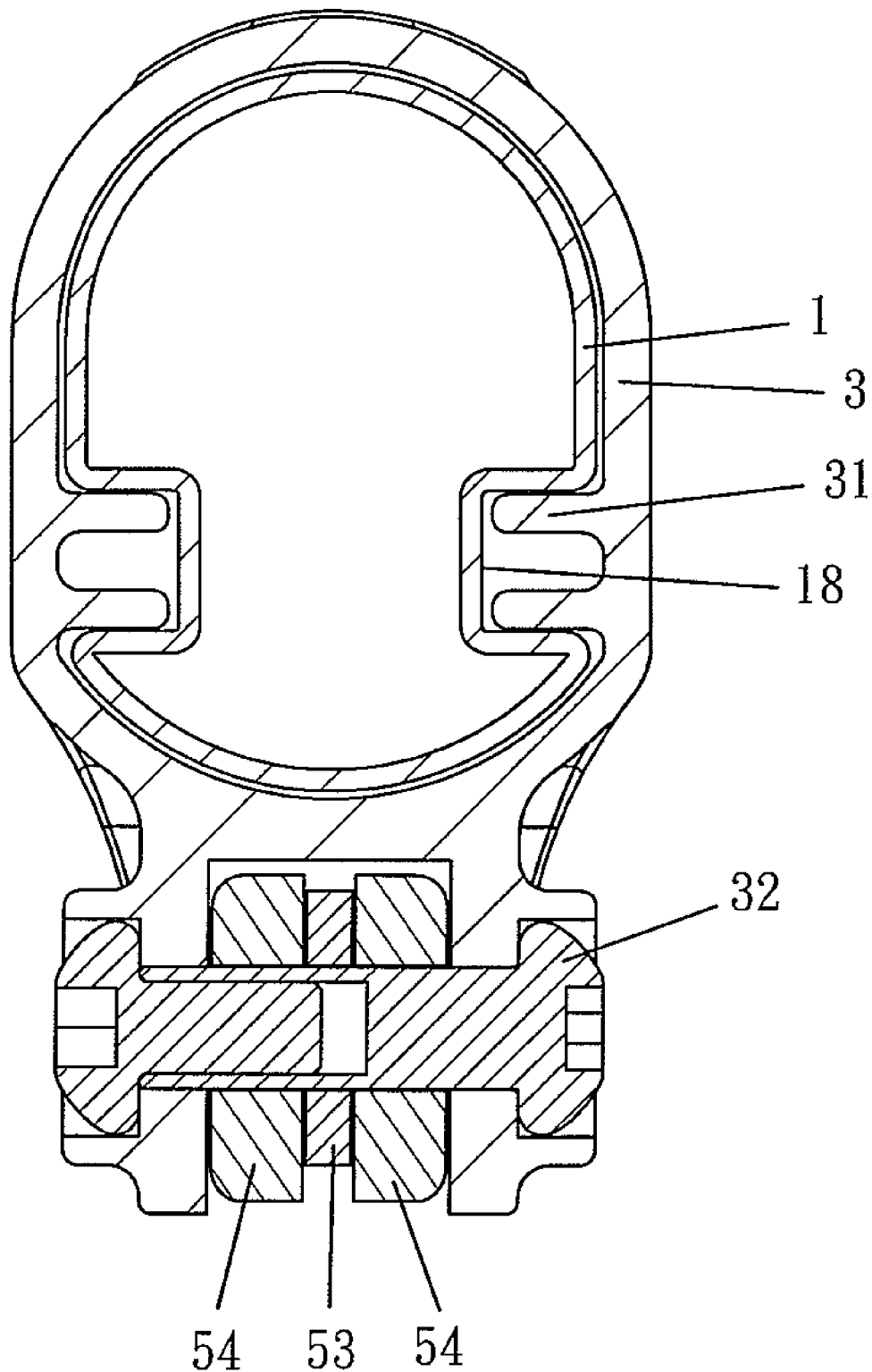
FIG. 5 is a sectional view of the bottom cart stand and the passive sliding chunk according to the present invention.
Figure 6:
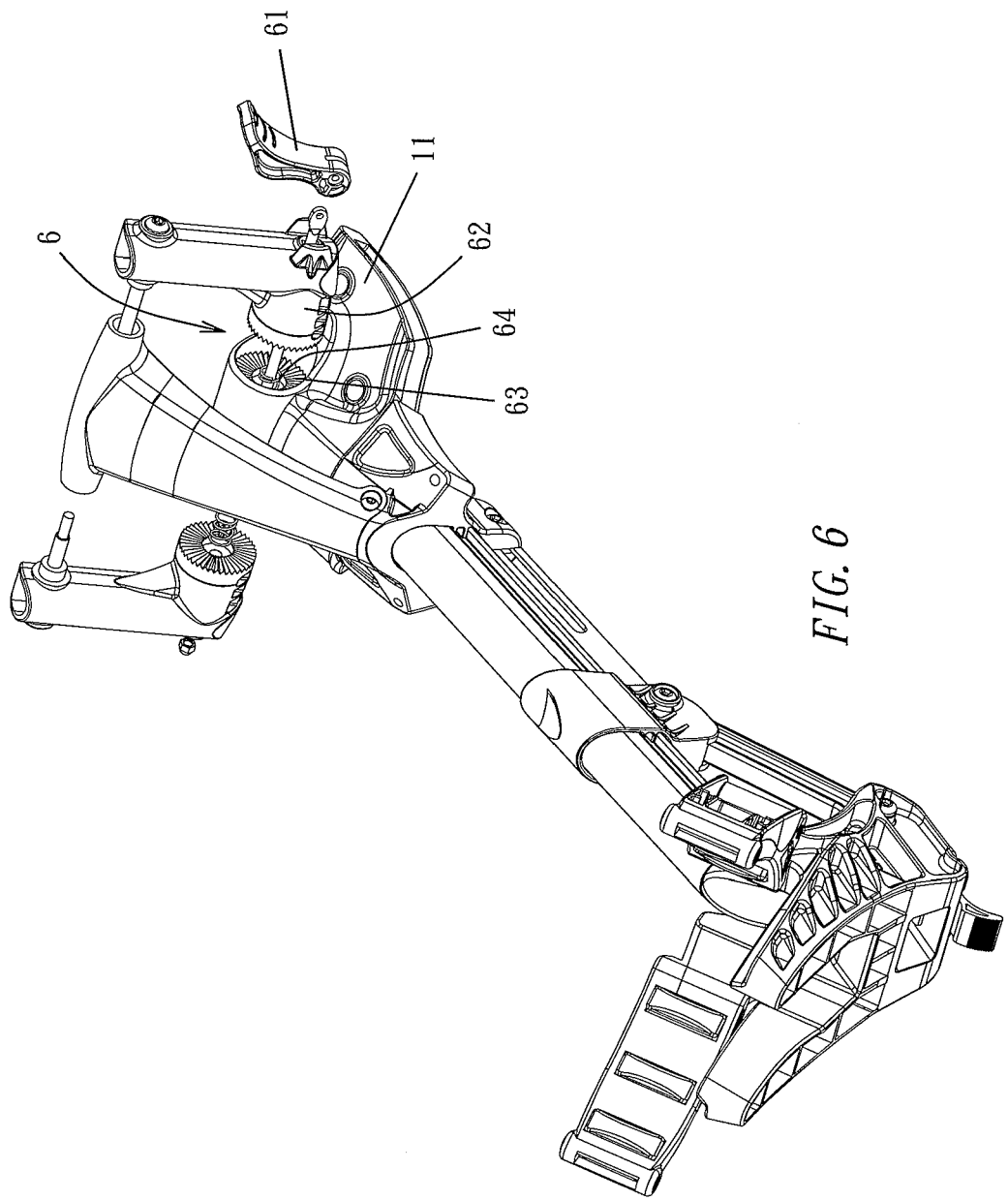
FIG. 6 is an exploded diagram of the folding joint according to the present invention.
Figure 7:
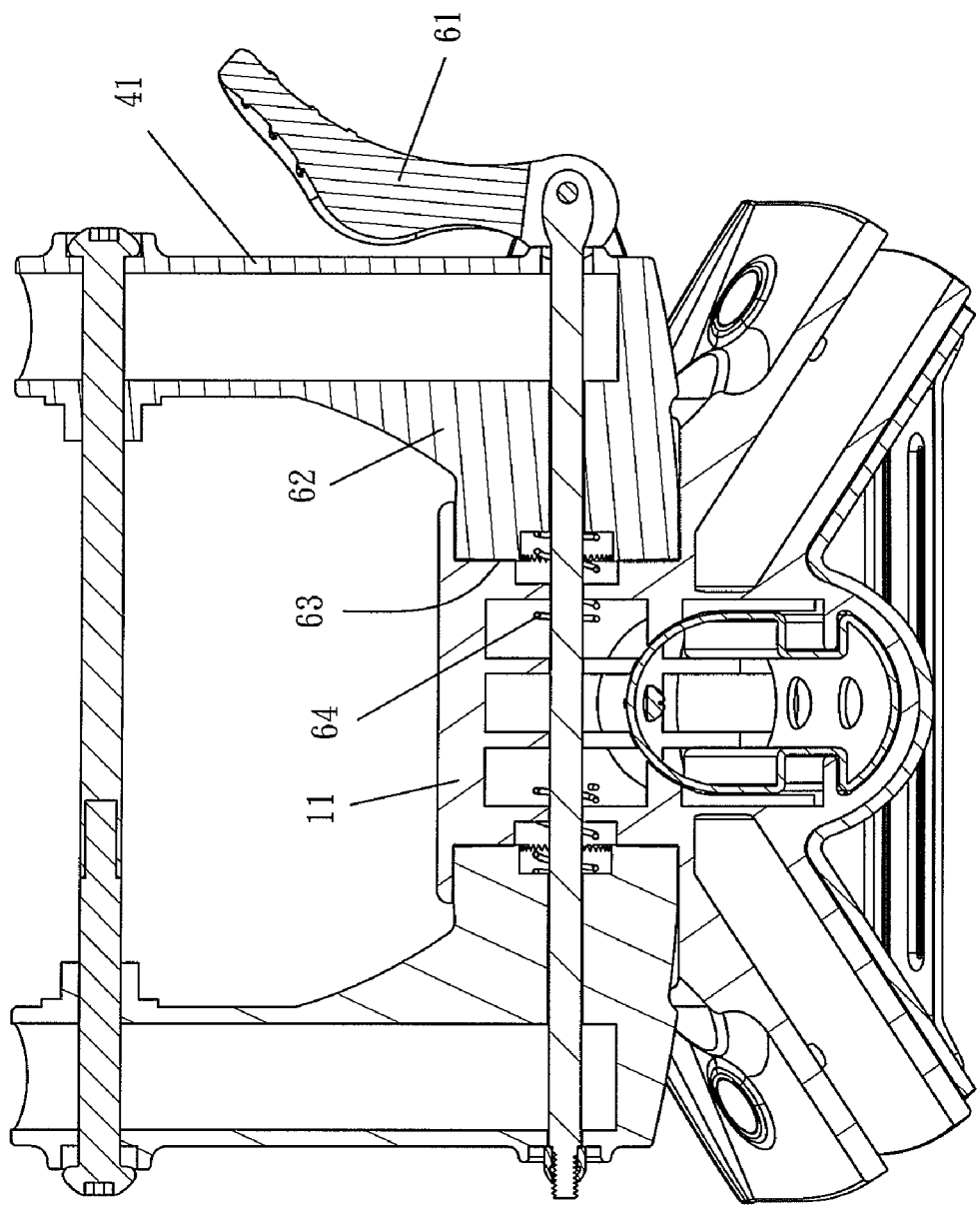
FIG. 7 is a sectional view for the locking of the folding joint according to the present invention.

According to the aforementioned structural combination, the bag cart of this invention is in the unfolding state under normal conditions, as shown in FIGS. 1 & 2, and the buckle 61 at the moment is in upward pulling state, which enables the relative position of the upper cart stand 4 and the bottom cart stand 1 to be fixed, shown in FIG. 7. The rear wheel frames 12 are fixed in the unfolding position of the bag cart, subject to the mutual reaction of the first link 51 and the second link 52, while the front wheel frame 16 is unable to move upward to be folded, subject to the mutual reaction of the third link 53 and the fourth link 54. The bag base 15 and the fixing chunk 14 of the bottom cart stand 1 each has a positioning face 141 or 151 and fit to each other, shown in FIG. 3, which limits the downward angle that the bag base 15 is relative to the bottom cart stand 1. Therefore, once the bag base 15 is fixed in the unfolding state, there is no need to immobilize any other joints.

Figure 8:
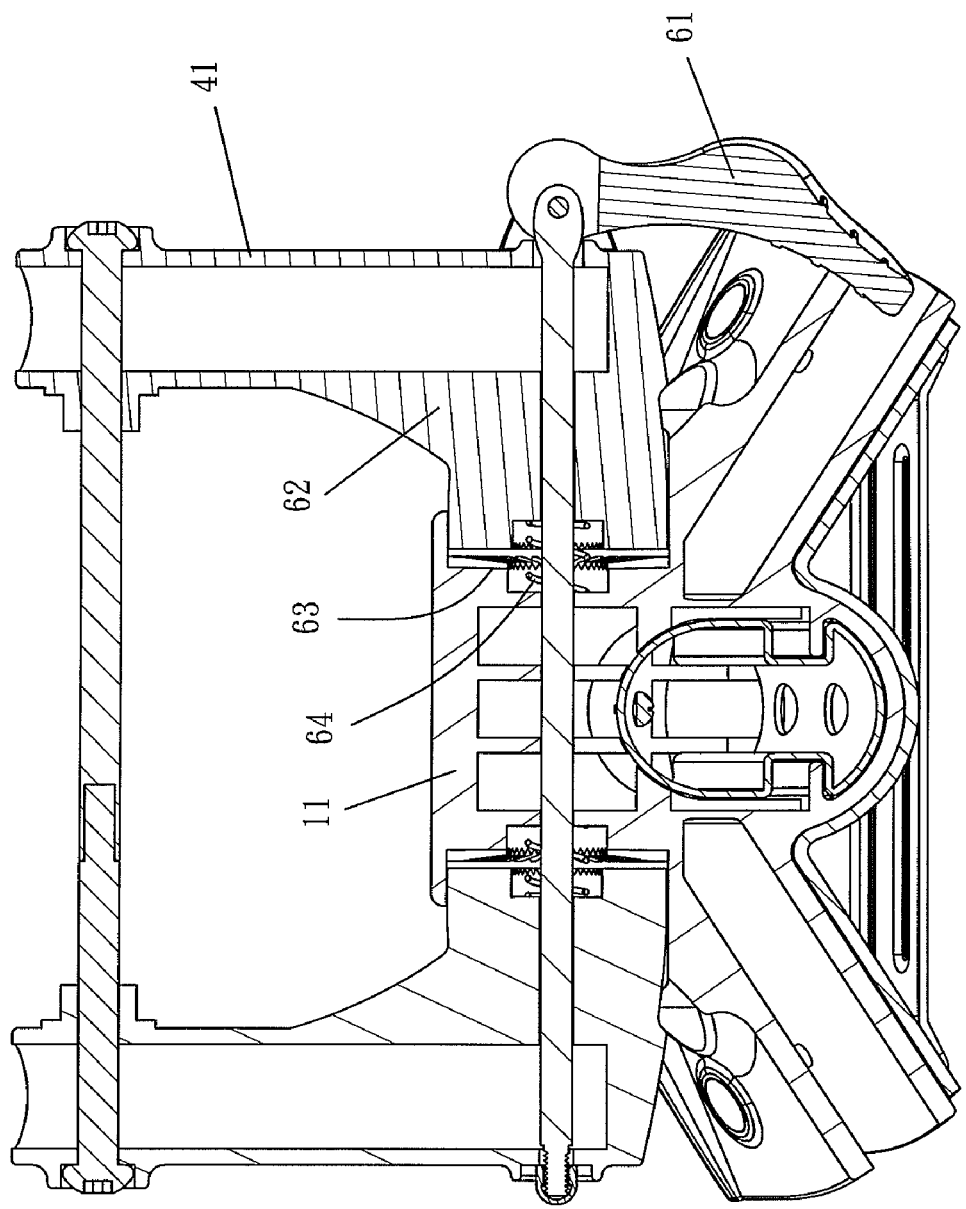
FIG. 8 is a sectional view for the unlocking of the folding joint according to the present invention.
Figure 9:
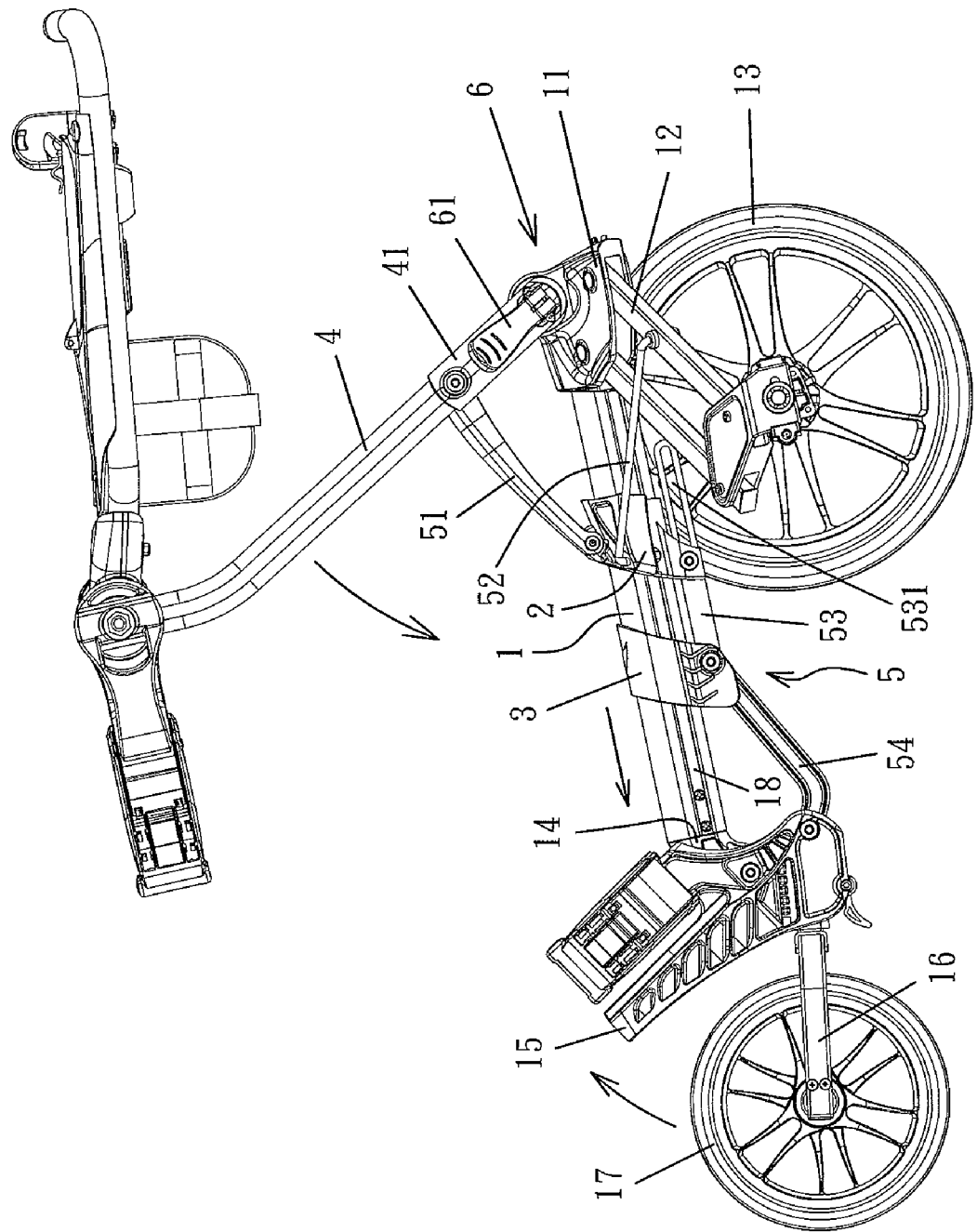
FIG. 9 is a schematic side view of the motion for folding according to the present invention.
Figure 10:
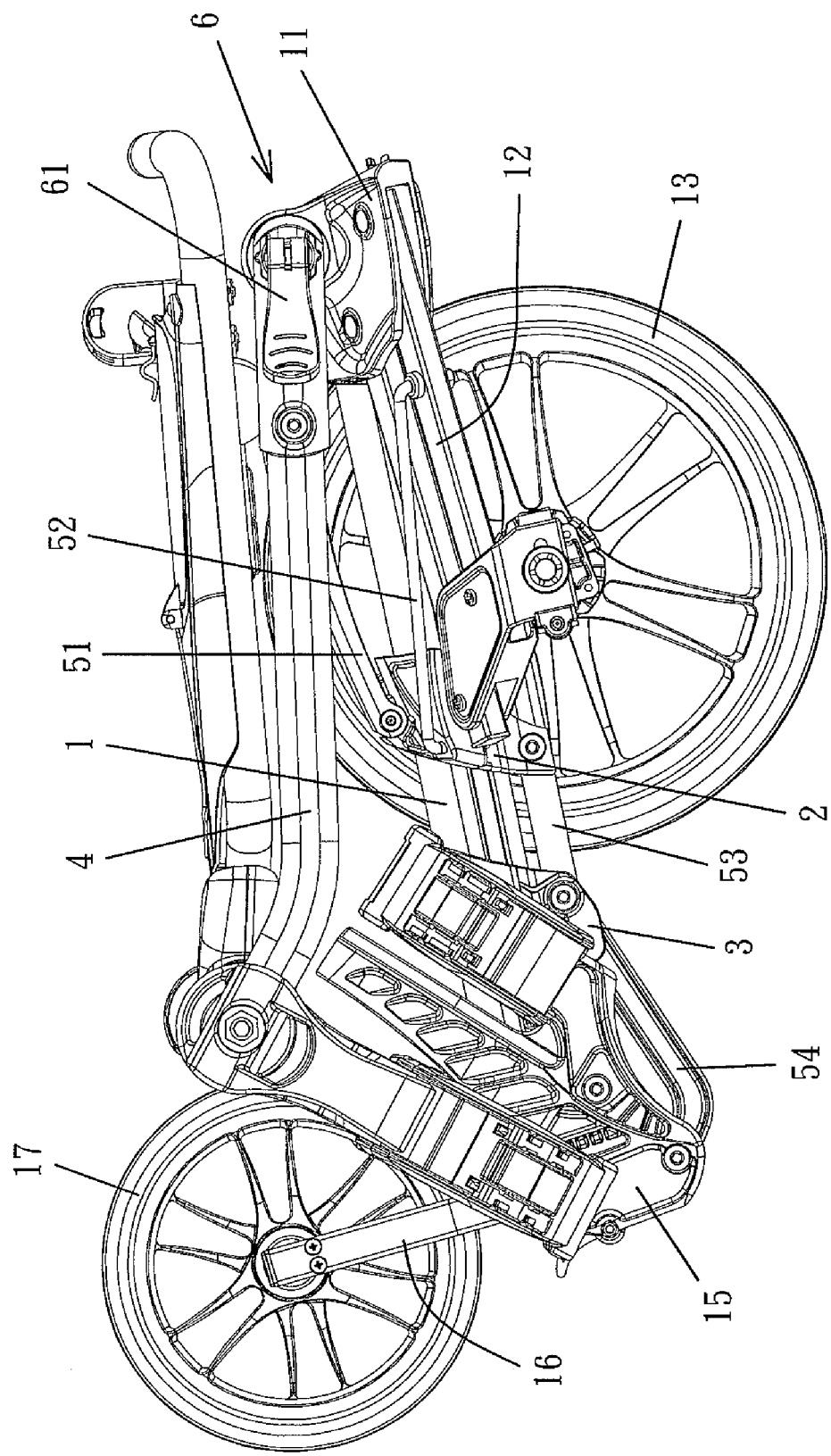
FIG. 10 is a schematic side view of the complete folding according to the present invention.
Figure 11:
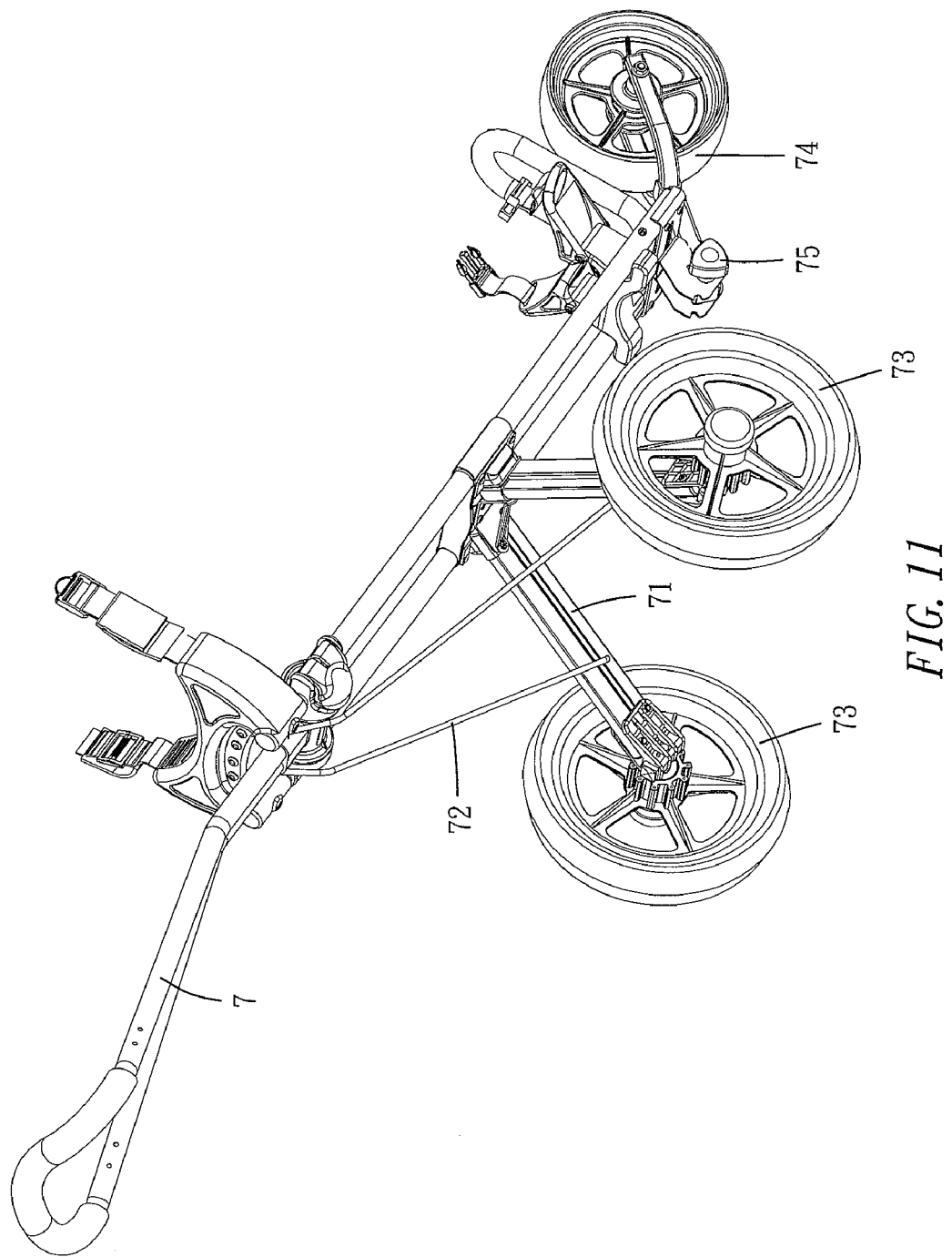
FIG. 11 is a three-dimensional diagram of the unfolding of the golf bag cart according to the present invention.

If folding is intended, the buckle 61 is loosened first (pull the buckle 61 down) to release the folding joint 6, shown in FIG. 8, followed by pulling the upper cart stand 4 down. The first link 51 is driven by the winding member 41, which drives the active sliding chunk 2 to move forward (down) along the bottom cart stand 1, shown in FIG. 9. Meanwhile, the active sliding chunk 2 pulls the rear wheel frames 12 through the second link 52, to move forward and inward, and the rear wheels 13 follow suit to move forward and inward. As the active sliding chunk 2 slides to the end of the elongated indent 531 of the third link 53, it starts to press the third link 53 and to drive the passive sliding chunk 3 to move forward (down). At the same time, the fourth link 54 is linked to drive the bag base 15 and the front wheel frame 16 to move up for being folded, and the front wheel 17 is upward folded too. The buckle 61 is then pulled up to lock the folding joint 6, which enables the upper cart stand 4 and the bottom cart stand 1 to be fixed, to accomplish the folding of the entire bag cart, shown in FIG. 10.

Briefly, just to loosen the buckle 61 and to pull the upper cart stand 4, the simultaneous folding for the upper cart stand 4, the bottom cart stand 1, the front wheel 17 and the rear wheels 13 can be accomplished, which substantially facilitate handiness in use.

On the contrary, once unfolding is desired, the buckle 61 has to be loosened first, followed by an upward lifting on the upper cart stand 4. The simultaneous unfolding of the front wheel 17, the rear wheels 13, the upper cart stand 4 and the bottom cart stand 1 can be accomplished, subject to the links between the first link 51, the second link 52, the third link 53 and the fourth link 54 and the active sliding chunk 2, the passive sliding chunk 3 with the front wheel frame 16 and the rear wheel frame 12. As the unfolding is in place, the buckle 61 is locked to have the upper cart stand 4 and the bottom cart stand 1 secured to each other, which completes unfolding of the entire bag cart, shown in FIGS. 1 & 2, considerably to facilitate the handiness in use.

From the aforesaid description, this invention features at least the following advantages and functions, which is much creative than the prior art:

1. The upper cart stand 4, the bottom cart stand 1, the front wheel 17 and the rear wheels 13 can be unfolded or folded simultaneously, which is truly handy in use.
2. During the folding of the cart, the mutual locking of the upper cart stand 4 and the bottom cart stand 1 enables a handy carrying and storing.
3. During the unfolding, the folding joint 6 is responsible for anchoring the cart. There is no need for additional joints to be fixed, which is truly handy in use.

To sum up, the disclosed concrete structure of the exemplified embodiments of the present invention is not only unknown to the prior art, but surely can accomplish the expected objective and function, which is construed as absolutely novel and creative.

What is claimed is:

1. A golf bag cart foldable device comprising:
   1.) a bottom cart stand having a plate joint, wherein the plate joint is in pinned connection with a rear wheel frame at each of two laterals to connect to rear wheels, with the bottom cart stand connected to a bottom of a bag base, wherein the bottom of the bag base is joined to a front wheel frame to connect to a front wheel;
   2.) an upper cart stand having a winding member to pivotally connect to the plate joint;
   3.) a sliding chunk set on the bottom cart stand and slideable along the bottom cart stand, with the sliding chunk set including an active sliding chunk and a passive sliding chunk;
   4.) a link set, including a plurality of links, connecting to the upper cart stand, the bottom cart stand, the front wheel frame, the rear wheel frames and the sliding chunk set respectively, to form links between the upper cart stand and the bottom cart stand and between the front wheel frame and the rear wheel frame; and
   5.) a folding joint on the winding member of the upper cart stand, with the folding joint having a buckle for release of the folding joint first, and by the upper cart stand being pulled by the link set, simultaneous unfolding or folding of the upper cart stand, the bottom cart stand, the front wheel and the rear wheels is accomplished, followed by locking for the folding joint, to enable a mutual locking between the upper cart stand and the bottom cart stand, to facilitate handiness in use.

2. A golf bag cart foldable device as in claim 1, wherein the bottom cart stand has a fixing chunk to pivotally connect to the bag base, wherein the fixing chunk and the bag base each has a positioning face fit to each other.

3. A golf bag cart foldable device as in claim 1, wherein the active sliding chunk and the passive sliding chunk of the sliding chunk set and the bottom cart stand are protruded tracks and track grooves respectively, which are fit to each other and fixed by a fixing element.

4. A golf bag cart foldable device as in claim 1, wherein the link set comprises:
   1.) a first link coupled to the winding member of the upper cart stand and to the active sliding chunk;
   2.) a second link coupled to the active sliding chunk at one end and to the rear wheel frames at another end;
   3.) a third link at a bottom of the bottom cart stand and coupled between the active sliding chunk and the passive sliding chunk, wherein a front part of the third link includes an elongated indent; and
   4.) a fourth link coupled to the passive sliding chunk at one end and to the bag base at another end.

* * * * *